US012187276B2

(12) United States Patent
Ren et al.

(10) Patent No.: US 12,187,276 B2
(45) Date of Patent: Jan. 7, 2025

(54) OBSTACLE TRAJECTORY PREDICTION METHOD AND APPARATUS (71) Applicant: Beijing Sankuai Online Technology Co., Ltd., Beijing (CN)

(72) Inventors: Dongchun Ren, Beijing (CN); Mingyu Fan, Beijing (CN); Huaxia Xia, Beijing (CN); Yanliang Zhu, Beijing (CN); Deheng Qian, Beijing (CN); Xin Li, Beijing (CN)

(73) Assignee: Beijing Sankuai Online Technology Co., Ltd., Beijing (CN)

( * ) Notice: Subject to any disclaimer, the term of this patent is extended or adjusted under 35 U.S.C. 154(b) by 262 days.

(21) Appl. No.: 17/908,918

(22) PCT Filed: Mar. 23, 2021

(86) PCT No.: PCT/CN2021/082310
§ 371 (c)(1),
(2) Date: Sep. 2, 2022

(87) PCT Pub. No.: WO2021/190484
PCT Pub. Date: Sep. 30, 2021

(65) Prior Publication Data
US 2023/0100814 A1 Mar. 30, 2023

(30) Foreign Application Priority Data
Mar. 23, 2020 (CN) .......................... 202010204950.1

(51) Int. Cl.
*B60W 30/095* (2012.01)
*B60W 40/04* (2006.01)
(Continued)

(52) U.S. Cl.
CPC ........ *B60W 30/0956* (2013.01); *B60W 40/04* (2013.01); *B60W 50/0097* (2013.01);
(Continued)

(58) Field of Classification Search
CPC .............. B60W 30/08; B60W 30/095; B60W 30/0953; B60W 30/0956; B60W 40/04;
(Continued)

(56) References Cited

U.S. PATENT DOCUMENTS

2019/0152490 A1* 5/2019 Lan ........................ G06V 20/58
2019/0185010 A1 6/2019 Ganguli et al.
(Continued)

FOREIGN PATENT DOCUMENTS

CN 110187707 A 8/2019
CN 110275531 A 9/2019
(Continued)

OTHER PUBLICATIONS

ISA State Intellectual Property Office of the People's Republic of China, International Search Report Issued in Application No. PCT/CN2021/082310, Jun. 30, 2021, WIPO, 4 pages.
(Continued)

*Primary Examiner* — Russell Frejd
*Assistant Examiner* — Brandon Z Willis
(74) *Attorney, Agent, or Firm* — Kilpatrick Townsend & Stockton LLP (57) ABSTRACT

An obstacle trajectory prediction method and apparatus are provided. In some embodiments, a global interaction feature under joint action of a vehicle and obstacles is determined according to historical status information and current status information of the vehicle, historical status information and current status information of the obstacles, and a future motion trajectory planned by the vehicle; an individual interaction feature of a to-be-predicted obstacle is determined according to the global interaction feature and current status information of the to-be-predicted obstacle; and a future motion trajectory of the to-be-predicted obstacle is
(Continued)

predicted through the individual interaction feature and information about an environment around the vehicle.

15 Claims, 3 Drawing Sheets (51) Int. Cl.
*B60W 50/00* (2006.01)
*G06N 3/049* (2023.01)
*G06T 7/246* (2017.01)
*G06V 20/58* (2022.01)

(52) U.S. Cl.
CPC ............. *G06N 3/049* (2013.01); *G06T 7/246* (2017.01); *G06V 20/58* (2022.01); *B60W 2050/0028* (2013.01); *B60W 2420/403* (2013.01); *B60W 2554/4041* (2020.02); *B60W 2554/4044* (2020.02); *B60W 2556/10* (2020.02); *G06T 2207/20081* (2013.01); *G06T 2207/20084* (2013.01); *G06T 2207/30241* (2013.01); *G06T 2207/30261* (2013.01)

(58) Field of Classification Search
CPC ..... B60W 50/0097; B60W 2050/0028; B60W 60/0027; B60W 60/00272; B60W 60/00274; B60W 60/00276; B60W 2420/403; B60W 2554/40; B60W 2554/4041; B60W 2554/4044; B60W 2554/4045; B60W 2554/4049; B60W 2554/80; B60W 2554/806; B60W 2556/10; B60W 2754/10; G06N 3/049; G06T 7/246; G06T 7/251; G06T 2207/20081; G06T 2207/20084; G06T 2207/30241; G06T 2207/30261; G06V 10/82; G06V 20/58; G06F 18/241

See application file for complete search history.

(56) References Cited

U.S. PATENT DOCUMENTS

| | | | |
|---|---|---|---|
| 2019/0185013 A1 | 6/2019 | Zhou et al. | |
| 2020/0339116 A1* | 10/2020 | Xu | B60W 30/18145 |
| 2021/0146963 A1* | 5/2021 | Li | G06N 20/00 |
| 2021/0200230 A1* | 7/2021 | Ross | G05D 1/0088 |
| 2022/0227367 A1* | 7/2022 | Kario | B60W 30/0956 |

FOREIGN PATENT DOCUMENTS

| | | |
|---|---|---|
| CN | 110371112 A | 10/2019 |
| CN | 110674723 A | 1/2020 |
| CN | 111079721 A | 4/2020 |

OTHER PUBLICATIONS

State Intellectual Property Office of the People's Republic of China, Office Action and Search Report Issued in Application No. 2020102049501, May 9, 2020, 9 pages.(Submitted with Machine/Partial Translation).

* cited by examiner

OBSTACLE TRAJECTORY PREDICTION METHOD AND APPARATUS

CROSS REFERENCE TO RELATED APPLICATION

This application is a US National Phase of a PCT Application No. PCT/CN2021/082310, filed on Mar. 23, 2021, which claims priority to the Chinese Patent Application No. 202010204950.1, filed to the China Patent Office on Mar. 23, 2020, the contents of which are incorporated herein by reference in their entireties.

TECHNICAL FIELD

The present disclosure relates to the field of unmanned driving technologies, and in particular, to an obstacle trajectory prediction method and apparatus.

BACKGROUND

At present, as an important part of the artificial intelligence technology, vehicle intelligence plays an increasingly prominent role in social production and life, and has become one of main directions to guide the development of the transportation technology.

When path planning is performed on an unmanned vehicle and/or vehicle with an assistance driving function (hereinafter collectively referred to as a "vehicle"), in order to ensure safe traveling of the vehicle, the vehicle needs to avoid surrounding obstacles. The obstacles include a static obstacle and a moving obstacle. It is easy for the vehicle to avoid the static obstacle because the static obstacle is stationary. However, if the vehicle is to avoid the moving obstacle accurately, a future traveling trajectory of the moving obstacle needs to be predicted.

SUMMARY

Embodiments of the present disclosure provide an obstacle trajectory prediction method and apparatus, to partly resolve the problem in the prior art.

The present disclosure provides an obstacle trajectory prediction method, including:
monitoring one or more obstacles around a vehicle;
obtaining, for each of the one or more obstacles, historical status information and current status information of the obstacle;
determining a current interaction feature under current joint action of the vehicle and the one or more obstacles according to historical status information and current status information of the vehicle and the historical status information and the current status information of each of the one or more obstacles;
obtaining a future motion trajectory of the vehicle planned by the vehicle, and determining a future motion trajectory feature of the vehicle according to the future motion trajectory of the vehicle;
determining a global interaction feature under the joint action of the vehicle and the one or more obstacles according to the determined current interaction feature and the future motion trajectory feature of the vehicle;
determining, for a to-be-predicted obstacle in the one or more obstacles, an individual interaction feature of the to-be-predicted obstacle under the joint action according to current status information of the to-be-predicted obstacle and the global interaction feature; and
inputting the individual interaction feature of the to-be-predicted obstacle and information about an environment around the vehicle into a pre-trained trajectory prediction model, to cause the trajectory prediction model to output a future motion trajectory of the to-be-predicted obstacle.

In some embodiments, determining the current interaction feature under current joint action of the vehicle and the one or more obstacles according to historical status information and current status information of the vehicle and the historical status information and the current status information of each of the one or more obstacles includes: determining position features of the vehicle and each of the one or more obstacles according to the current status information of the vehicle and the current status information of each of the one or more obstacles; obtaining hidden variables respectively corresponding to the vehicle and each of the one or more obstacles according to the historical status information and the current status information of the vehicle and the historical status information and the current status information of each of the one or more obstacles, and determining tracking features of the vehicle and each of the one or more obstacles according to the hidden variables respectively corresponding to the vehicle and each of the one or more obstacles, wherein the hidden variables are used for representing a status difference of the vehicle or each of the one or more obstacles from a historical status to a current status; determining a motion feature of the vehicle according to the historical status information and the current status information of the vehicle; and determining the current interaction feature under the current joint action of the vehicle and the one or more obstacles according to the position features, the tracking features, and the motion feature of the vehicle.

In some embodiments, determining the individual interaction feature of the to-be-predicted obstacle under the joint action according to current status information of the to-be-predicted obstacle and the global interaction feature includes: determining a feature vector corresponding to the current status information of the to-be-predicted obstacle as a current status vector of the to-be-predicted obstacle; determining a feature vector corresponding to the global interaction feature as a global interaction vector; and determining the individual interaction feature of the to-be-predicted obstacle under the joint action according to a vector dot product of the current status vector of the to-be-predicted obstacle and the global interaction vector.

In some embodiments, inputting information about the environment around the vehicle into the pre-trained trajectory prediction model includes: acquiring an actual image of a current environment around the vehicle; determining a global environment feature according to the actual image; determining, according to a position of the to-be-predicted obstacle in the actual image, a position of a local environment feature corresponding to the to-be-predicted obstacle in the global environment feature as a reference position; determining an environment feature corresponding to the reference position in the global environment feature as the local environment feature corresponding to the to-be-predicted obstacle; and inputting the determined local environment feature corresponding to the to-be-predicted obstacle into the pre-trained trajectory prediction model.

In some embodiments, determining the global environment feature according to the actual image includes: recognizing key elements included in the actual image; determining positions of the key elements in the actual image; generating an abstract image corresponding to the actual image according to the positions of the key elements in the actual image and predetermined models respectively matching the key elements; and determining the global environment feature according to the abstract image.

In some embodiments, the pre-trained trajectory prediction model includes a long short-term memory (LSTM) model including an encoder and a decoder; and inputting the individual interaction feature of the to-be-predicted obstacle and information about the environment around the vehicle into the pre-trained trajectory prediction model, to cause the trajectory prediction model to output the future motion trajectory of the to-be-predicted obstacle includes: determining a status difference of the to-be-predicted obstacle from a historical status to a current status according to historical status information and current status information of the to-be-predicted obstacle; inputting the individual interaction feature of the to-be-predicted obstacle, the information about the environment around the vehicle, and the status difference of the to-be-predicted obstacle into the encoder, to cause the encoder to output a hidden variable corresponding to the to-be-predicted obstacle; and inputting the hidden variable corresponding to the to-be-predicted obstacle, the individual interaction feature of the to-be-predicted obstacle, the information about the environment around the vehicle, and the status difference of the to-be-predicted obstacle into the decoder, to cause the decoder to output the future motion trajectory of the to-be-predicted obstacle.

In some embodiments, obtaining the hidden variable corresponding to the vehicle according to the historical status information and the current status information of the vehicle includes: determining a status difference of the vehicle from the historical status to the current status according to the historical status information and the current status information of the vehicle; and inputting an individual interaction feature of the vehicle, the information about the environment around the vehicle, and the status difference of the vehicle into the encoder, to cause the encoder to output the hidden variable corresponding to the vehicle, wherein the individual interaction feature of the vehicle is obtained according to the current status information of the vehicle and the global interaction feature; and obtaining the hidden variables respectively corresponding to each of the one or more obstacles according to the historical status information and the current status information of each of the one or more obstacles includes: for each of the one or more obstacles, determining, a status difference of the obstacle from the historical status to the current status according to the historical status information and the current status information of the obstacle; and inputting an individual interaction feature of the obstacle, the information about the environment around the vehicle, and the status difference of the obstacle from the historical status to the current status into the encoder, to cause the encoder to output the hidden variable corresponding to the obstacle.

The present disclosure provides an obstacle trajectory prediction apparatus, including:
- a monitoring module, configured to monitor one or more obstacles around a vehicle;
- an obtaining module, configured to obtain, for each of the one or more obstacles, historical status information and current status information of the obstacle;
- a current interaction feature determining module, configured to determine a current interaction feature under current joint action of the vehicle and the one or more obstacles according to historical status information and current status information of the vehicle and the historical status information and the current status information of each of the one or more obstacles;
- a future motion trajectory feature determining module, configured to obtain a future motion trajectory of the vehicle planned by the vehicle, and determine a future motion trajectory feature of the vehicle according to the future motion trajectory of the vehicle;
- a global interaction feature determining module, configured to determine a global interaction feature under the joint action of the vehicle and the one or more obstacles according to the determined current interaction feature and the future motion trajectory feature of the vehicle;
- an individual interaction feature determining module, configured, for a to-be-predicted obstacle in the one or more obstacles, an individual interaction feature of the to-be-predicted obstacle under the joint action according to current status information of the to-be-predicted obstacle and the global interaction feature; and
- a prediction module, configured to input the individual interaction feature of the to-be-predicted obstacle and information about an environment around the vehicle into a pre-trained trajectory prediction model, to cause the trajectory prediction model to output a future motion trajectory of the to-be-predicted obstacle.

The present disclosure provides a computer-readable storage medium, storing a computer program, the computer program, when executed by a processor, implementing the above obstacle trajectory prediction method.

The present disclosure provides an unmanned driving device, including a memory, a processor, and a computer program stored on the memory and runnable on the processor, where the processor implements the above obstacle trajectory prediction method when executing the program.

DETAILED DESCRIPTION OF THE EMBODIMENTS

When a future traveling trajectory of a moving obstacle is predicted, in order to improve the accuracy of prediction, in addition to considering status information of the obstacle at a current moment, the influence of other obstacles (and a vehicle) interacting with the obstacle also needs to be considered. Although there is a trajectory prediction method that takes into account interaction between the obstacle and the other obstacles (and the vehicle), this method represents interaction between the obstacles and the vehicle only through current status information of the obstacles and the vehicle. If a future motion trajectory is predicted only through the interaction based on the current status information, the accuracy of obstacle trajectory prediction is inevitably affected.

In the present disclosure, a current interaction feature (representing current interaction information) under joint action of a vehicle and obstacles is determined through historical status information and current status information of the vehicle and historical status information and current status information of the obstacles, a global interaction feature (representing future interaction information) under the joint action of the vehicle and the obstacles is determined through the current interaction feature and a future motion trajectory of the vehicle planned by the vehicle, and a future motion trajectory is predicted according to the global interaction feature. Because the future motion trajectory of the vehicle planned by the vehicle is known, the known future motion trajectory may serve as priori knowledge to construct the future interaction information, and the future interaction information has higher reliability. Compared with using the current interaction information, the accuracy is higher when a future motion trajectory of an obstacle is predicted through the future interaction information.

To clearly state the objectives and advantages of the present disclosure, the embodiments of the present disclosure will be clearly and completely described below with reference to specific embodiments of the present disclosure and the accompanying drawings. Apparently, the described embodiments are only some embodiments rather than all the embodiments of the present disclosure. All other embodiments obtained by a person of ordinary skill in the art based on the embodiments of the present disclosure without creative efforts shall fall within the protection scope of the present disclosure.

The following describes the embodiment provided in each embodiment of the present disclosure in detail with reference to the accompanying drawings.

Figure 1:
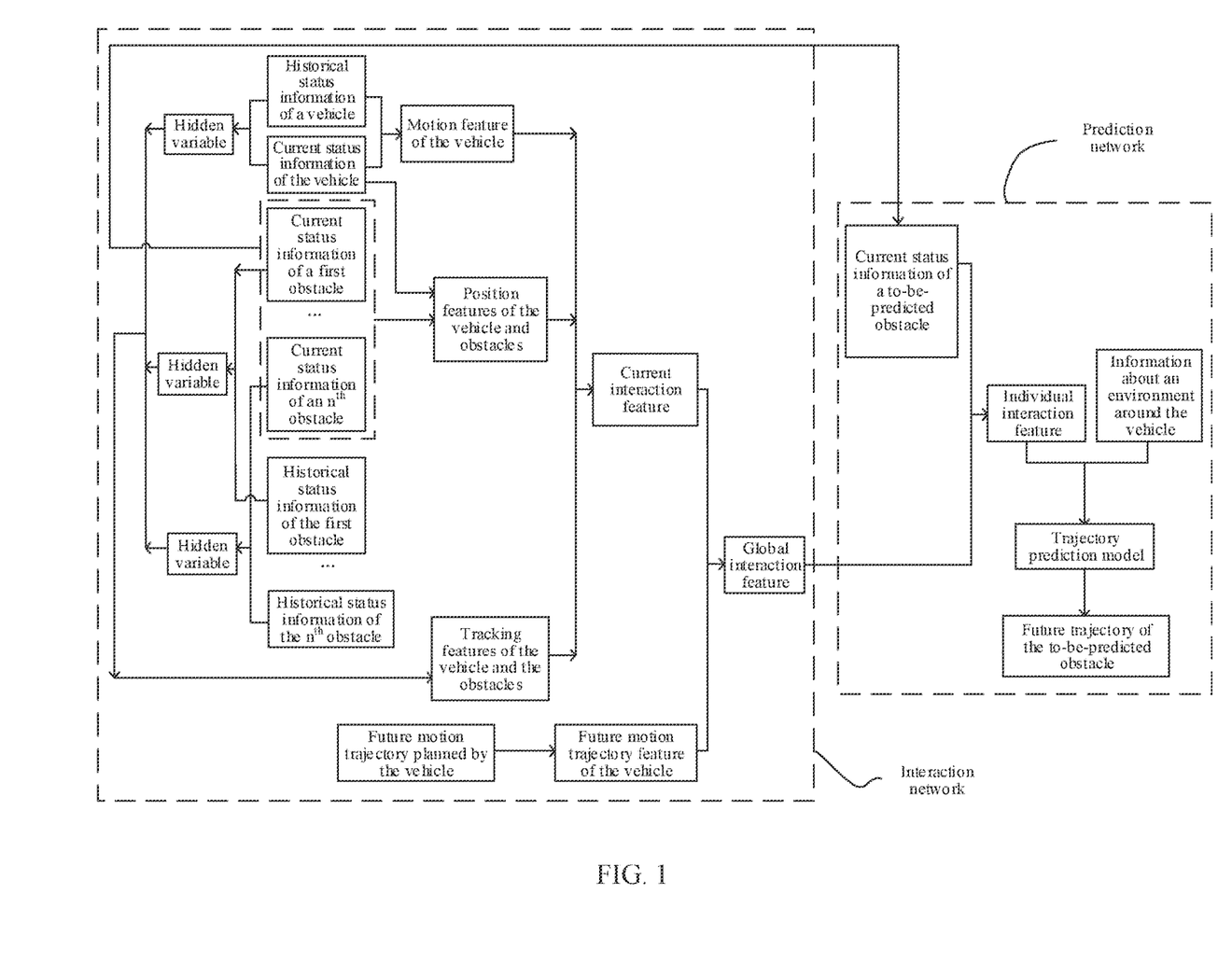
FIG. 1 is a schematic diagram of a system architecture of an obstacle trajectory prediction method according to an embodiment of the present disclosure.

In an embodiment of the present disclosure, a trajectory of an obstacle may be predicted by using a system architecture shown in FIG. 1, and the system architecture mainly includes two parts: an interaction network and a prediction network.

The interaction network is configured to determine, for a vehicle and each of obstacles, a motion feature of the vehicle according to historical status information and current status information of the vehicle; determine position features of the vehicle and each obstacle according to the current status information of the vehicle and current status information of each obstacle; determine hidden variables respectively corresponding to the vehicle and each obstacle according to the historical status information and the current status information of the vehicle and historical status information and the current status information of each obstacle, and determine tracking features of the vehicle and each obstacle according to the hidden variables respectively corresponding to the vehicle and each obstacle; determine a current interaction feature according to the motion feature of the vehicle, the position features of the vehicle and each obstacle, and the tracking features of the vehicle and each obstacle; determine a future motion trajectory feature of the vehicle through a future motion trajectory of the vehicle planned by the vehicle; and determine a global interaction feature of the vehicle and each obstacle according to the current interaction feature and the future motion trajectory feature of the vehicle. After the interaction network determines the global interaction feature, the prediction network is configured to predict a future motion trajectory of a to-be-predicted obstacle in the obstacles: first, determining an individual interaction feature according to current status information of the to-be-predicted obstacle and the global interaction feature; and inputting the determined individual interaction feature and information about an environment around the vehicle into a trajectory prediction model, to cause the trajectory prediction model to output the future motion trajectory of the to-be-predicted obstacle.

In some examples, the system architecture can be implemented on a computer of the vehicle, and a central processing unit (CPU) of the computer executes corresponding programs stored on a memory. In other examples, the system architecture can be implemented on a terminal that can interact with the vehicle, such as a smartphone, a smart watch, a notebook computer, a dedicated computer, or another device. In still other examples, the system architecture can be implemented on a cloud device that can interact with the vehicle, such as a server, or a cloud processor. This is not limited in this application. For simplicity, an example in which the system architecture is implemented on the computer of the vehicle is subsequently used for description.

Figure 2:
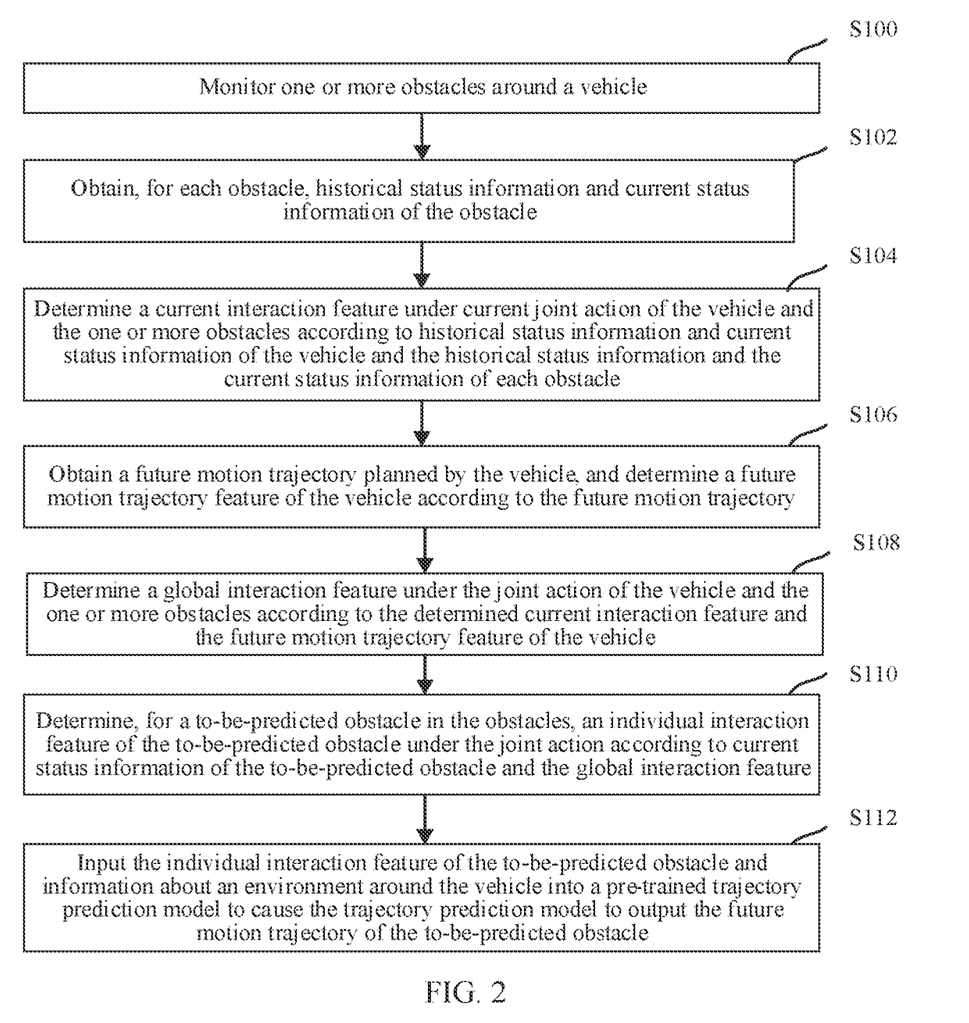
FIG. 2 is a schematic flowchart of an obstacle trajectory prediction method according to an embodiment of the present disclosure.

The above process is described in detail below with reference to the accompanying drawings. As shown in FIG. 2, FIG. 2 is a schematic flowchart of an obstacle trajectory prediction method according to an embodiment of the present disclosure, and the method includes:

S100. Monitor one or more obstacles around a vehicle.

There may be various obstacles interacting with the vehicle around the vehicle during traveling. To ensure safe traveling of the vehicle, each of the obstacles around the vehicle may be monitored, and status information and other data of each obstacle are obtained for analysis. The status information may be: coordinates (x, y) where the obstacle is located, a velocity (v) of the obstacle, an acceleration (a) of the obstacle, and the like. It should be noted that, a quantity and types of obstacles interacting with the vehicle around the vehicle dynamically change, that is, there are three obstacles a, b, and c interacting with the vehicle in one time period, and there may be four obstacles a, c, d and e interacting with the vehicle in another time period. Therefore, the vehicle needs to monitor the obstacles interacting with the vehicle in real time, and update acquired data in time.

S102. Obtain, for each obstacle, historical status information and current status information of the obstacle.

The status information of the obstacle may be acquired by a device on the vehicle interacting with the obstacle, for example, acquired by a camera, radar, and another device mounted on the vehicle, acquired by a sensor mounted on the obstacle and sent to the vehicle interacting with the obstacle through the network, or determined by a cloud device based on a position of the obstacle and sent to the vehicle through the network. The current status information may be status information of the obstacle at a current moment. The historical status information may be status information of the obstacle at a previous moment of the current moment, or status information of the obstacle at a plurality of historical moments in a previous time period of the current moment. Both the current status information and the historical status information are known information.

S104. Determine a current interaction feature under current joint action of the vehicle and the one or more obstacles according to historical status information and current status information of the vehicle and the historical status information and the current status information of each obstacle. The current interaction feature represents interaction of the vehicle and the obstacles at the current moment.

S106. Obtain a future motion trajectory of the vehicle planned by the vehicle, and determine a future motion trajectory feature of the vehicle according to the future motion trajectory of the vehicle.

The future motion trajectory of the vehicle planned by the vehicle during traveling is known, and the future motion trajectory may serve as priori knowledge. The future motion trajectory may be a motion trajectory from the current moment to next moment, or a series of motion trajectories formed by motion trajectories from the current moment to a plurality of future moments. By using an example in which the future motion trajectory is the series of the motion trajectories formed by the motion trajectories from the current moment to the plurality of future moments, the current moment is defined as t, the plurality of future moments are respectively defined as t+1, t+2, and t+3, and position coordinates of the vehicle at the moments t+1, t+2, and t+3 are respectively defined as $P^{t+1}_{ego}$, $P^{t+2}_{ego}$, and $P^{t+3}_{ego}$. After the future motion trajectory of the vehicle planned by the vehicle is obtained, feature vectors may be respectively extracted from $P^{t+1}_{ego}$, $P^{t+2}_{ego}$, and $P^{t+3}_{ego}$, the extracted feature vectors are spliced, and max-pooling processing is performed on the spliced feature vectors, so that the future motion trajectory feature of the vehicle is obtained.

In some examples, a feature vector at a moment may be extracted by an embedding method. Formally, the embedding method represents an object with a low-dimensional and dense vector. The embedding vector can express some features of the corresponding object, and distances between vectors reflect the similarity between objects.

S108. Determine a global interaction feature under the joint action of the vehicle and the one or more obstacles according to the determined current interaction feature and the future motion trajectory feature of the vehicle.

By splicing a feature vector corresponding to the current interaction feature and a feature vector corresponding to the future motion trajectory feature of the vehicle, the global interaction feature under the joint action of the vehicle and the obstacles may be obtained. As mentioned above, the current interaction feature combines the historical status information and the current status information, and is used for representing the interaction of the vehicle and the obstacles at the current moment. Based on the current interaction feature, the global interaction feature adds the future motion trajectory of the vehicle, combines the current status information and predicted future status information, and can represent interaction of the vehicle and the obstacles at a future moment to some extent.

S110. Determine, for a to-be-predicted obstacle in the obstacles, an individual interaction feature of the to-be-predicted obstacle under the joint action according to current status information of the to-be-predicted obstacle and the determined global interaction feature. The to-be-predicted obstacle is any obstacle in the obstacles.

When a future motion trajectory of the to-be-predicted obstacle is predicted, because an interaction feature of a vehicle or obstacle closer to the to-be-predicted obstacle has a greater influence on trajectory prediction of the to-be-predicted obstacle, and an interaction feature of a vehicle or obstacle farther away from the to-be-predicted obstacle has a lower influence on the trajectory prediction of the to-be-predicted obstacle, predicting the future motion trajectory of the to-be-predicted obstacle only through the global interaction feature has limitations. In this embodiment of the present disclosure, an individual interaction feature of a to-be-predicted obstacle under joint action of a vehicle and obstacles is determined according to current status information of the to-be-predicted obstacle and a global interaction feature, the individual interaction feature is a part of the global interaction feature and can represent surrounding interaction information of the to-be-predicted obstacle at a future moment to some extent, and the interaction information includes future status information of the to-be-predicted obstacle.

S112. Input the individual interaction feature of the to-be-predicted obstacle and information about an environment around the vehicle into a pre-trained trajectory prediction model, to cause the trajectory prediction model to output the future motion trajectory of the to-be-predicted obstacle.

Information about an environment around the to-be-predicted obstacle is not easily obtained, but the information about the environment around the vehicle is easily obtained. For example, the information about the environment around the vehicle interacting with the to-be-predicted obstacle may represent the information about the environment around the to-be-predicted obstacle.

In some examples, the current status information of the to-be-predicted obstacle, the individual interaction feature of the to-be-predicted obstacle, and the information about the environment around the vehicle may also be inputted into the pre-trained trajectory prediction model, to cause the trajectory prediction model to output the future motion trajectory of the to-be-predicted obstacle. It should be noted that, when the future motion trajectory of the to-be-predicted obstacle is predicted, status information at next moment may be predicted according to status information at a current moment; and status information (namely, a series of motion trajectories) in a future time period (including a plurality of moments) may also be predicted according to status information in a current time period (including a plurality of moments).

In S104 of FIG. 2, position features of the vehicle and each obstacle may be determined according to the current status information of the vehicle and the current status information of each obstacle. Specifically, continuing with the foregoing example, the feature vector may be extracted according to the current status information of the vehicle. The current status information of the vehicle may be represented by position coordinates of the vehicle at the current moment t, and the position coordinates are defined as $P^{t}_{ego}$. Similarly, the feature vector may also be extracted according to the current status information of each obstacle, where the current status information of each obstacle may also be represented by position coordinates of the obstacle. 1, 2, 3, . . . , n may represent the obstacles, and position coordinates of the obstacles may be defined as $P^{t}_1$, $P^{t}_2$, $P^{t}_3$, . . . , $P^{t}_n$ sequentially. The feature vectors corresponding to the current status information of the vehicle and the obstacles may be spliced, that is, feature vectors corresponding to $P^{t}_{ego}$, $P^{t}_1$, $P^{t}_2$, $P^{t}_3$, . . . , $P^{t}_n$ are spliced, and max-pooling processing is performed on the spliced feature vectors, so that the position features of the vehicle and the obstacles are obtained.

In some examples, feature vectors corresponding to various pieces of status information may be obtained by the embedding method. When different feature vectors are calculated, used weight matrices may be different.

In some examples, hidden variables respectively corresponding to the vehicle and each obstacle may be obtained according to the historical status information and the current status information of the vehicle and the historical status information and the current status information of each obstacle; and tracking features of the vehicle and each obstacle may be determined according to the hidden variables respectively corresponding to the vehicle and each obstacle. The hidden variables are used for representing a status difference of the vehicle or each obstacle from a historical status to a current status. Because status differences of the vehicle and different obstacles from the historical status to the current status are all different, the hidden variables can represent tracking information of the vehicle and the obstacles to some extent. As mentioned above, because the quantity of obstacles interacting with the vehicle around the vehicle dynamically changes, if the obstacles are tracked in a numbered manner, it is undoubtedly time-consuming and labor-intensive and the tracking effect is poor. In this embodiment of the present disclosure, by using hidden variables, time-series motion information, namely, tracking information, between obstacles interacting with a vehicle can be obtained without numbering the obstacles. The tracking information assists trajectory prediction, so that the accuracy of trajectory prediction can be improved. In addition, the method for determining tracking features is similar to the above method for determining position features, that is, feature vectors are first extracted for the hidden variables, the extracted feature vectors are spliced, and maxi-pooling processing is performed on the spliced feature vectors, so that the tracking features can be obtained. Details are not described herein again.

To ensure simplicity of an overall structure, in some examples, the hidden variables may be obtained by a model in the prediction network.

Generally, the above position coordinate information is all determined by using a world coordination system. Therefore, this embodiment of the present disclosure is applicable to a scenario of the world coordination system. This embodiment of the present disclosure may also be applicable to a vehicle coordination system (that is, a coordination system established with the vehicle as a center). Specifically, when a future motion trajectory of an obstacle is predicted, a motion feature of the vehicle may be determined according to the historical status information and the current status information of the vehicle. The motion feature of the vehicle represents a status difference of the vehicle from a historical status to a current status. When the future motion trajectory of the obstacle is predicted in the vehicle coordination system, various pieces of position coordinate information in the vehicle coordination system may be determined with reference to the motion feature of the vehicle.

After the position features, the tracking features, and the motion feature of the vehicle are determined in the above manner, the position features, the tracking features, and the motion feature of the vehicle may be inputted into a gated recurrent unit (GRU) for further feature extraction, so that feature vectors are further extracted from the extracted features, and the current interaction feature under the current joint action of the vehicle and the obstacles is finally obtained. A long short-term memory (LSTM) model may also replace the GRU model to extract features, and another model may also be used. This is not limited in this embodiment of the present disclosure.

In S110 of FIG. 2, the manner of determining the individual interaction feature may include: determining a feature vector corresponding to the current status information of the to-be-predicted obstacle as a current status vector $e^t$ of the to-be-predicted obstacle; determining a feature vector corresponding to the global interaction feature as a global interaction vector $fst^t$; and determining an individual interaction feature $q^t$ of the to-be-predicted obstacle under the joint action according to a vector dot product of the current status vector $e^t$ of the to-be-predicted obstacle and the global interaction vector $fst^t$. That is, $q^t = fst^t \odot e^t$, where $q^t$ represents a feature vector corresponding to the individual interaction feature, and $\odot$ represents the vector dot product.

In S112 of FIG. 2, an actual image of a current environment around the vehicle may be acquired, and a global environment feature may be determined according to the actual image; a position of a local environment feature corresponding to the to-be-predicted obstacle in the global environment feature is determined as a reference position according to a position of the to-be-predicted obstacle in the actual image; an environment feature corresponding to the reference position in the global environment feature is determined as the local environment feature corresponding to the to-be-predicted obstacle; and the determined local environment feature corresponding to the to-be-predicted obstacle is inputted into the pre-trained trajectory prediction model, so that the accuracy of trajectory prediction can be further improved. The above manner of determining the local environment feature may be specifically implemented by an aligning technology of a region of interest (ROI). In addition, if the actual image is acquired in a manner of a top view, the effectiveness of information about an environment is stronger.

In some examples, the actual image may also be converted into an abstract image, and some irrelevant elements in the actual image, such as surrounding trees and houses, can be removed, and only key elements, such as a road map, a traffic route, traffic lights, and other information, are reserved. Simplified information can improve the prediction efficiency. The manner of converting the actual image into the abstract image may include: recognizing key elements included in the actual image; determining positions of the key elements in the actual image; generating, for each of the key elements, the abstract image corresponding to the actual image according to the position of the key element in the actual image and a predetermined model matching the key element; and inputting the generated abstract image into a pre-trained environment model, to cause the environment model to output the global environment feature according to the abstract image.

After the individual interaction feature of the to-be-predicted obstacle and the information about the environment around the vehicle are obtained in the above manner, the individual interaction feature and the information about the environment may be inputted into the pre-trained trajectory prediction model, to cause the trajectory prediction model to output the future motion trajectory of the to-be-predicted obstacle. The pre-trained trajectory prediction model may be an LSTM model including an encoder and a decoder. A status difference of the to-be-predicted obstacle from a historical status to a current status may be determined according to historical status information and the current status information of the to-be-predicted obstacle. The individual interaction feature of the to-be-predicted obstacle, the information about the environment around the vehicle, and the status difference of the to-be-predicted obstacle from the historical status to the current status are inputted into the encoder, to cause the encoder to output a hidden variable corresponding to the to-be-predicted obstacle. The hidden variable corresponding to the to-be-predicted obstacle, the individual interaction feature of the to-be-predicted obstacle, the information about the environment around the vehicle, and the status difference of the to-be-predicted obstacle from the historical status to the current status are inputted into the decoder, to cause the decoder to output the future motion trajectory of the to-be-predicted obstacle.

In some examples, a hidden variable corresponding to the vehicle may be obtained according to the historical status information and the current status information of the vehicle. Specifically, a status difference of the vehicle from a historical status to a current status may be determined according to the historical status information and the current status information of the vehicle; and an individual interaction feature of the vehicle, the information about the environment around the vehicle, and the status difference of the vehicle from the historical status to the current status are inputted into the encoder, to cause the encoder to output the hidden variable corresponding to the vehicle, wherein the individual interaction feature of the vehicle is obtained according to the current status information of the vehicle and the global interaction feature.

In some examples, a hidden variable respectively corresponding to each obstacle may be obtained according to the historical status information and the current status information of each obstacle. Specifically, for each obstacle, a status difference of the obstacle from a historical status to a current status may be determined according to the historical status information and the current status information of the obstacle; and an individual interaction feature of the obstacle, the information about the environment around the vehicle, and the status difference of the obstacle from the historical status to the current status are inputted into the encoder, to cause the encoder to output the hidden variable corresponding to the obstacle, wherein the individual interaction feature of the obstacle is obtained according to the current status information of the obstacle and the global interaction feature.

In this embodiment of the present disclosure, the trajectory prediction model may be the LSTM model, and the environment model may be a convolutional neural network (CNN) model. The trajectory prediction model and the environment model may also be other models, which are not limited in this embodiment of the present disclosure.

In the embodiments of the present disclosure, a current interaction feature (representing current interaction information through history and current) of a vehicle and obstacles is determined through historical status information and current status information of the vehicle and historical status information and current status information of the obstacles. Based on the current interaction feature, a future motion trajectory of the vehicle planned by the vehicle is added as priori knowledge, to obtain a global interaction feature (representing future interaction information through current and future). An individual interaction feature (namely, a part of the global interaction feature, which represents future interaction information around a to-be-predicted obstacle) is determined through the global interaction feature and current status information of the to-be-predicted obstacle, and a future motion trajectory of the to-be-predicted obstacle is predicted based on this. In the embodiments of the present disclosure, by representing future interaction information between the vehicle and the obstacles through the global interaction feature, when the trajectory of the to-be-predicted obstacle is predicted, not only the influence of interaction between the vehicle and the obstacles on the future motion trajectory of the to-be-predicted obstacle is considered, but the future motion trajectory planned by the vehicle serves as a reference. Because the future motion trajectory planned by the vehicle is known, the future motion trajectory planned by the vehicle may serve as priori knowledge in the present disclosure, and can represent future interaction of the vehicle and the obstacles to some extent. Through this manner, the predicted future motion trajectory is closer to an actual trajectory. When the vehicle is in an environment with a more complex traffic condition, a future motion trajectory of an obstacle can also be more accurately predicted.

The obstacle trajectory prediction method provided in the embodiments of the present disclosure can predict how an obstacle travels in the future, so that a vehicle can avoid the obstacle. The method can also provide a correction reference for path planning of the vehicle, that is, a future motion trajectory planned by the vehicle first serves as priori knowledge, the priori knowledge is used for assisting obstacles to predict future motion trajectories, and then the future motion trajectory (namely, the priori knowledge) planned by the vehicle is corrected through the future motion trajectories of the obstacles, so that the path planning of the vehicle is more accurate. The trajectory prediction method may also be applied in other fields. This is not limited in the embodiments of the present disclosure.

The obstacle trajectory prediction method provided in the present disclosure may be specifically used for path planning for an unmanned vehicle or obstacle avoidance for the unmanned vehicle. The unmanned vehicle may be an unmanned delivery vehicle, and the unmanned delivery vehicle may be applied to a field of using unmanned delivery vehicles for delivery, such as a scenario in which unmanned delivery vehicles are used for express delivery, takeaway delivery, and other delivery. Specifically, in the above scenario, an automatic driving fleet formed by a plurality of unmanned delivery vehicles may be used for delivery. The method may be applied to an automatic driving device such as the above unmanned vehicle, or applied to a server or cloud computing device that communicates with the automatic driving device.

The foregoing describes the obstacle trajectory prediction method provided in the embodiments of the present disclosure. Based on the same thought, the present disclosure further provides a corresponding apparatus, a storage medium, and an unmanned driving device.

Figure 3:
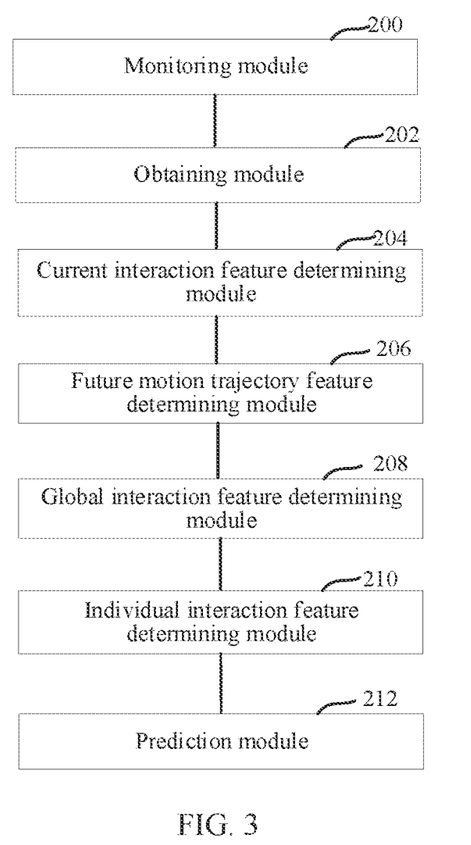
FIG. 3 is a schematic structural diagram of an obstacle trajectory prediction apparatus according to an embodiment of the present disclosure.

FIG. 3 is a schematic structural diagram of an obstacle trajectory prediction apparatus according to an embodiment of the present disclosure. The apparatus includes:

- a monitoring module 200, configured to monitor obstacles around a vehicle;
- an obtaining module 202, configured to obtain, for each obstacle, historical status information and current status information of the obstacle;
- a current interaction feature determining module 204, configured to determine a current interaction feature under current joint action of the vehicle and the one or more obstacles according to historical status information and current status information of the vehicle and the historical status information and the current status information of each obstacle;
- a future motion trajectory feature determining module 206, configured to obtain a future motion trajectory planned by the vehicle, and determine a future motion trajectory feature of the vehicle according to the future motion trajectory;
- a global interaction feature determining module 208, configured to determine a global interaction feature under the joint action of the vehicle and the one or more obstacles according to the determined current interaction feature and the future motion trajectory feature of the vehicle;
- an individual interaction feature determining module 210, configured, for a to-be-predicted obstacle in the one or more obstacles, an individual interaction feature of the to-be-predicted obstacle under the joint action according to current status information of the to-be-predicted obstacle and the global interaction feature; and
- a prediction module 212, configured to input the individual interaction feature of the to-be-predicted obstacle and information about an environment around the vehicle into a pre-trained trajectory prediction model, to cause the trajectory prediction model to output a future motion trajectory of the to-be-predicted obstacle.

In some embodiments, the current interaction feature determining module 204 is configured to determine position features of the vehicle and each obstacle according to the current status information of the vehicle and the current status information of each obstacle; obtain hidden variables respectively corresponding to the vehicle and each obstacle according to the historical status information and the current status information of the vehicle and the historical status information and the current status information of each obstacle, and determine tracking features of the vehicle and each obstacle according to the hidden variables respectively corresponding to the vehicle and each obstacle, wherein the hidden variables are used for representing a status difference of the vehicle or each obstacle from a historical status to a current status; determine a motion feature of the vehicle according to the historical status information and the current status information of the vehicle; and determine a current interaction feature under the current joint action of the vehicle and the one or more obstacles according to the position features, the tracking features, and the motion feature of the vehicle.

In some embodiments, the individual interaction feature determining module 210 is configured to determine a feature vector corresponding to the current status information of the to-be-predicted obstacle as a current status vector of the to-be-predicted obstacle; determine a feature vector corresponding to the global interaction feature as a global interaction vector; and determine the individual interaction feature of the to-be-predicted obstacle under the joint action according to a vector dot product of the current status vector of the to-be-predicted obstacle and the global interaction vector.

In some embodiments, the prediction module 212 is configured to acquire an actual image of a current environment around the vehicle; determine a global environment feature according to the actual image; determine, according to a position of the to-be-predicted obstacle in the actual image, a position of a local environment feature corresponding to the to-be-predicted obstacle in the global environment feature as a reference position; determine an environment feature corresponding to the reference position in the global environment feature as the local environment feature corresponding to the to-be-predicted obstacle; and input the determined local environment feature corresponding to the to-be-predicted obstacle into the pre-trained trajectory prediction model.

In some embodiments, the prediction module 212 is further configured to recognize key elements included in the actual image; determine positions of the key elements in the actual image; generate an abstract image corresponding to the actual image according to the positions of the key elements in the actual image and predetermined models respectively matching the key elements; and determine the global environment feature according to the abstract image.

In some embodiments, the pre-trained trajectory prediction model may be an LSTM model including an encoder and a decoder. The prediction module 212 is further configured to determine a status difference of the to-be-predicted obstacle from a historical status to a current status according to historical status information and current status information of the to-be-predicted obstacle; input the individual interaction feature of the to-be-predicted obstacle, the information about the environment around the vehicle, and the status difference of the to-be-predicted obstacle from the historical status to the current status into the encoder, to cause the encoder to output a hidden variable corresponding to the to-be-predicted obstacle; and input the hidden variable corresponding to the to-be-predicted obstacle, the individual interaction feature of the to-be-predicted obstacle, the information about the environment around the on the vehicle, and the status difference of the to-be-predicted obstacle from the historical status to the current status into the decoder, to cause the decoder to output the future motion trajectory of the to-be-predicted obstacle.

In some embodiments, the current interaction feature determining module 204 is further configured to determine a status difference of the vehicle from a historical status to a current status according to the historical status information and the current status information of the vehicle; and input an individual interaction feature of the vehicle, the information about the environment around the vehicle, and the status difference of the vehicle from the historical status to the current status into the encoder, to cause the encoder to output a hidden variable corresponding to the vehicle, wherein the individual interaction feature of the vehicle is obtained according to the current status information of the vehicle and the global interaction feature.

In some embodiments, the current interaction feature determining module 204 is further configured to determine, for each obstacle, a status difference of the obstacle from a historical status to a current status according to the historical status information and the current status information of the obstacle; and input an individual interaction feature of the obstacle, the information about the environment around the vehicle, and the status difference of the obstacle from the historical status to the current status into the encoder, to cause the encoder to output a hidden variable corresponding to the obstacle, wherein the individual interaction feature of the obstacle is obtained according to the current status information of the obstacle and the global interaction feature.

The present disclosure further provides a computer-readable storage medium, storing a computer program, the computer program, when executed by a controller, causing the controller to implement the obstacle trajectory prediction method shown in FIG. 2.

Figure 4:
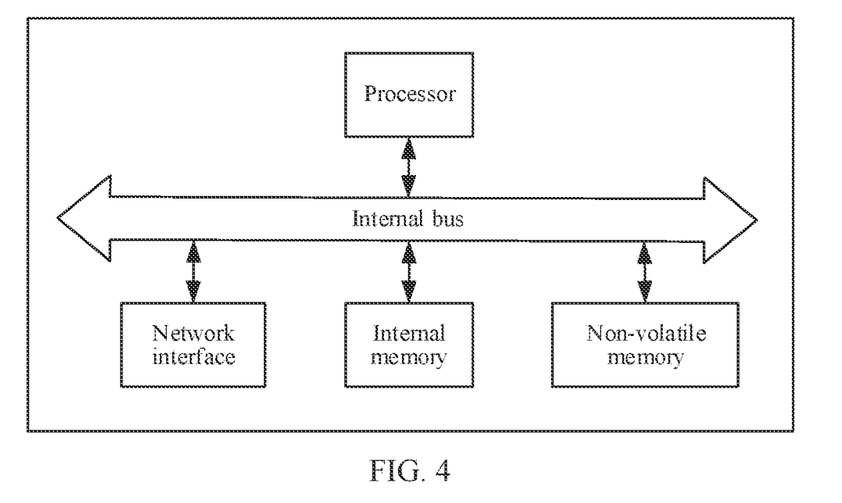
FIG. 4 is a schematic structural diagram of an unmanned driving device according to an embodiment of the present disclosure.

Based on the obstacle trajectory prediction method shown in FIG. 2, an embodiment of the present disclosure further provides a schematic structural diagram of an unmanned driving device shown in FIG. 4. As shown in FIG. 4, on a hardware level, the unmanned driving device includes a processor, an internal bus, a network interface, a memory, and a non-volatile memory, and may include other hardware required by services. The processor reads a corresponding instruction from the non-volatile storage into the memory and then runs the instruction, to implement the obstacle trajectory prediction method described in FIG. 2.

In addition to a software implementation, the present disclosure does not exclude other implementations, for example, a logic device or a combination of software and hardware. In other words, an entity executing the following processing procedure is not limited to the logic units, and may also be hardware or logic devices.

In the 1990s, improvements in a technology can be clearly categorized as hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), Altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller comprise, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses comprised therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be specifically implemented by a computer chip or an entity, or implemented by a product having a certain function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. In implementation of the present disclosure, the function of the units may be integrated in the same piece of or a plurality of pieces of software and/or hardware for implementation.

A person skilled in the art can understand that the embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (comprising but not limited to a disk memory, a compact disc read-only memory (CD-ROM) and an optical memory) that comprise computer-usable program code.

The present disclosure is described with reference to flowcharts and/or block diagrams of the method, the device (system), and the computer program product in the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more procedures in the flowcharts and/or one or more blocks in the block diagrams.

The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device comprises one or more processors (CPU), an input/output interface, a network interface, and a memory.

The memory may comprise a form such as a volatile memory, a random access memory (RAM), and/or a non-volatile memory such as a read-only memory (ROM) or a flash memory (flash RAM) in a computer-readable medium. The memory is an example of the computer-readable medium.

The computer-readable medium comprises a non-volatile medium and a volatile medium, a movable medium and a non-movable medium, which may implement storage of information by using any method or technology. The information may be a computer-readable instruction, a data structure, a program module, or other data. An example of a computer storage medium comprises, but is not limited to, a phase-change memory (PRAM), a static random access memory (SRAM), a dynamic random access memory (DRAM), another type of RAM, a read-only memory (ROM), an electrically erasable programmable read-only memory (EEPROM), a flash memory or another memory technology, a compact disc read-only memory (CD-ROM), a digital versatile disc (DVD) or another optical memory, a cartridge tape, a magnetic tape, a magnetic disk storage or another magnetic storage device, or any other non-transmission medium, which may be configured to store information accessible by a computing device. Based on the description in this specification, the computer-readable medium does not comprise transitory computer-readable media (transitory media), such as a modulated data signal and a carrier.

It should be noted that, the terms "comprise", "comprise", or any variants thereof are intended to cover a non-exclusive inclusion. Therefore, a process, method, article, or device that comprises a series of elements not only comprises such elements, but also comprises other elements not specified expressly, or may comprise inherent elements of the process, method, article, or device. Unless otherwise specified, an element limited by "comprise a/an . . . " does not exclude other same elements existing in the process, the method, the article, or the device that comprises the element.

The present disclosure can be described in the general context of computer-executable instructions executed by a computer, for example, a program module. Generally, the program module comprises a routine, a program, an object, a component, a data structure, and the like for executing a particular task or implementing a particular abstract data type. The present disclosure may also be practiced in distributed computing environments in which tasks are performed by remote processing devices that are connected by using a communications network. In a distributed computing environment, the program module may be located in both local and remote computer storage media comprising storage devices.

The embodiments in the present disclosure are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment. The foregoing is merely the embodiments of the present disclosure, and is not intended to limit the present disclosure. For a person skilled in the art, various modifications and variations can be made to the present disclosure. Any modification, equivalent replacement, or improvement made without departing from the spirit and principle of the present disclosure shall fall within the scope of the claims of the present disclosure.

The invention claimed is:

1. An obstacle trajectory prediction method, implemented by a vehicle, comprising:
    monitoring one or more obstacles around the vehicle;
    obtaining, for each of the one or more obstacles, historical status information and current status information of the obstacle;
    determining a current interaction feature under current joint action of the vehicle and the one or more obstacles according to historical status information and current status information of the vehicle and the historical status information and the current status information of each of the one or more obstacles;
    obtaining a future motion trajectory of the vehicle planned by the vehicle, and determining a future motion trajectory feature of the vehicle according to the future motion trajectory of the vehicle;
    determining a global interaction feature under the joint action of the vehicle and the one or more obstacles according to the determined current interaction feature and the future motion trajectory feature of the vehicle;
    determining, for a to-be-predicted obstacle in the one or more obstacles, an individual interaction feature of the to-be-predicted obstacle under the joint action according to current status information of the to-be-predicted obstacle and the global interaction feature; and
    inputting the individual interaction feature of the to-be-predicted obstacle and information about an environment around the vehicle into a pre-trained trajectory prediction model, to cause the trajectory prediction model to output a future motion trajectory of the to-be-predicted obstacle, wherein the future motion trajectory of the to-be-predicted obstacle is used by the vehicle to avoid the to-be-predicted obstacle.

2. The method according to claim 1, wherein determining the current interaction feature under current joint action of the vehicle and the one or more obstacles according to the historical status information and current status information of the vehicle and the historical status information and the current status information of each of the one or more obstacles comprises:
    determining position features of the vehicle and each of the one or more obstacles according to the current status information of the vehicle and the current status information of each of the one or more obstacles;
    obtaining hidden variables respectively corresponding to the vehicle and each of the one or more obstacles according to the historical status information and the current status information of the vehicle and the historical status information and the current status information of each of the one or more obstacles, and determining tracking features of the vehicle and each of the one or more obstacles according to the hidden variables respectively corresponding to the vehicle and each of the one or more obstacles, wherein the hidden variables are used for representing a status difference of the vehicle or each of the one or more obstacles from a historical status to a current status;
    determining a motion feature of the vehicle according to the historical status information and the current status information of the vehicle; and
    determining the current interaction feature under the current joint action of the vehicle and the one or more obstacles according to the position features, the tracking features, and the motion feature of the vehicle.

3. The method according to claim 2, wherein the pre-trained trajectory prediction model comprises a long short-term memory (LSTM) model comprising an encoder and a decoder; and
    inputting the individual interaction feature of the to-be-predicted obstacle and information about the environment around the vehicle into the pre-trained trajectory prediction model, to cause the trajectory prediction model to output the future motion trajectory of the to-be-predicted obstacle comprises:
    determining a status difference of the to-be-predicted obstacle from a historical status to a current status according to historical status information and current status information of the to-be-predicted obstacle;

inputting the individual interaction feature of the to-be-predicted obstacle, the information about the environment around the vehicle, and the status difference of the to-be-predicted obstacle into the encoder, to cause the encoder to output a hidden variable corresponding to the to-be-predicted obstacle; and inputting the hidden variable corresponding to the to-be-predicted obstacle, the individual interaction feature of the to-be-predicted obstacle, the information about the environment around the vehicle, and the status difference of the to-be-predicted obstacle into the decoder, to cause the decoder to output the future motion trajectory of the to-be-predicted obstacle.

4. The method according to claim 3, wherein obtaining the hidden variable corresponding to the vehicle according to the historical status information and the current status information of the vehicle comprises:

determining a status difference of the vehicle from the historical status to the current status according to the historical status information and the current status information of the vehicle; and inputting an individual interaction feature of the vehicle, the information about the environment around the vehicle, and the status difference of the vehicle into the encoder, to cause the encoder to output the hidden variable corresponding to the vehicle, wherein the individual interaction feature of the vehicle is obtained according to the current status information of the vehicle and the global interaction feature; and obtaining the hidden variables respectively corresponding to each of the one or more obstacles according to the historical status information and the current status information of each of the one or more obstacles comprises:

for each of the one or more obstacles, determining, a status difference of the obstacle from the historical status to the current status according to the historical status information and the current status information of the obstacle; and inputting an individual interaction feature of the obstacle, the information about the environment around the vehicle, and the status difference of the obstacle from the historical status to the current status into the encoder, to cause the encoder to output the hidden variable corresponding to the obstacle.

5. The method according to claim 1, wherein determining the individual interaction feature of the to-be-predicted obstacle under the joint action according to the current status information of the to-be-predicted obstacle and the global interaction feature comprises:

determining a feature vector corresponding to the current status information of the to-be-predicted obstacle as a current status vector of the to-be-predicted obstacle;

determining a feature vector corresponding to the global interaction feature as a global interaction vector; and determining the individual interaction feature of the to-be-predicted obstacle under the joint action according to a vector dot product of the current status vector of the to-be-predicted obstacle and the global interaction vector.

6. The method according to claim 1, wherein inputting the information about the environment around the vehicle into the pre-trained trajectory prediction model comprises:

acquiring an actual image of a current environment around the vehicle;

determining a global environment feature according to the actual image;

determining, according to a position of the to-be-predicted obstacle in the actual image, a position of a local environment feature corresponding to the to-be-predicted obstacle in the global environment feature as a reference position;

determining an environment feature corresponding to the reference position in the global environment feature as the local environment feature corresponding to the to-be-predicted obstacle; and inputting the determined local environment feature corresponding to the to-be-predicted obstacle into the pre-trained trajectory prediction model.

7. The method according to claim 6, wherein determining the global environment feature according to the actual image comprises:

recognizing key elements comprised in the actual image;

determining positions of the key elements in the actual image;

generating an abstract image corresponding to the actual image according to the positions of the key elements in the actual image and predetermined models respectively matching the key elements; and determining the global environment feature according to the abstract image.

8. A non-transitory computer-readable storage medium, storing a computer program, the computer program, when executed by a controller, causing the controller to implement operations comprising:

monitoring one or more obstacles around a vehicle;

obtaining, for each of the one or more obstacles, historical status information and current status information of the obstacle;

determining a current interaction feature under current joint action of the vehicle and the one or more obstacles according to historical status information and current status information of the vehicle and the historical status information and the current status information of each of the one or more obstacles;

obtaining a future motion trajectory of the vehicle planned by the vehicle, and determining a future motion trajectory feature of the vehicle according to the future motion trajectory of the vehicle;

determining a global interaction feature under the joint action of the vehicle and the one or more obstacles according to the determined current interaction feature and the future motion trajectory feature of the vehicle;

determining, for a to-be-predicted obstacle in the one or more obstacles, an individual interaction feature of the to-be-predicted obstacle under the joint action according to current status information of the to-be-predicted obstacle and the global interaction feature; and inputting the individual interaction feature of the to-be-predicted obstacle and information about an environment around the vehicle into a pre-trained trajectory prediction model, to cause the trajectory prediction model to output a future motion trajectory of the to-be-predicted obstacle, wherein the future motion trajectory of the to-be-predicted obstacle is used by the vehicle to avoid the to-be-predicted obstacle.

9. An unmanned driving device, comprising:

a processor; and a memory configured to store instructions executable by the processor, wherein the instructions, when executed, causes the processor to implement operations comprising:

monitoring one or more obstacles around a vehicle;

obtaining, for each of the one or more obstacles, historical status information and current status information of the obstacle;

determining a current interaction feature under current joint action of the vehicle and the one or more obstacles according to historical status information and current status information of the vehicle and the historical status information and the current status information of each of the one or more obstacles;

obtaining a future motion trajectory of the vehicle planned by the vehicle, and determining a future motion trajectory feature of the vehicle according to the future motion trajectory of the vehicle;

determining a global interaction feature under the joint action of the vehicle and the one or more obstacles according to the determined current interaction feature and the future motion trajectory feature of the vehicle;

determining, for a to-be-predicted obstacle in the one or more obstacles, an individual interaction feature of the to-be-predicted obstacle under the joint action according to current status information of the to-be-predicted obstacle and the global interaction feature; and inputting the individual interaction feature of the to-be-predicted obstacle and information about an environment around the vehicle into a pre-trained trajectory prediction model, to cause the trajectory prediction model to output a future motion trajectory of the to-be-predicted obstacle, wherein the future motion trajectory of the to-be-predicted obstacle is used by the vehicle to avoid the to-be-predicted obstacle.

10. The device according to claim 9, wherein determining the current interaction feature under current joint action of the vehicle and the one or more obstacles according to historical status information and current status information of the vehicle and the historical status information and the current status information of each of the one or more obstacles comprises:

determining position features of the vehicle and each of the one or more obstacles according to the current status information of the vehicle and the current status information of each of the one or more obstacles;

obtaining hidden variables respectively corresponding to the vehicle and each of the one or more obstacles according to the historical status information and the current status information of the vehicle and the historical status information and the current status information of each of the one or more obstacles, and determining tracking features of the vehicle and each of the one or more obstacles according to the hidden variables respectively corresponding to the vehicle and each of the one or more obstacles, wherein the hidden variables are used for representing a status difference of the vehicle or each of the one or more obstacles from a historical status to a current status;

determining a motion feature of the vehicle according to the historical status information and the current status information of the vehicle; and determining the current interaction feature under the current joint action of the vehicle and the one or more obstacles according to the position features, the tracking features, and the motion feature of the vehicle.

11. The device according to claim 10, wherein the pre-trained trajectory prediction model comprises a long short-term memory (LSTM) model comprising an encoder and a decoder; and inputting the individual interaction feature of the to-be-predicted obstacle and information about the environment around the vehicle into the pre-trained trajectory prediction model, to cause the trajectory prediction model to output the future motion trajectory of the to-be-predicted obstacle comprises:

determining a status difference of the to-be-predicted obstacle from a historical status to a current status according to historical status information and current status information of the to-be-predicted obstacle;

inputting the individual interaction feature of the to-be-predicted obstacle, the information about the environment around the vehicle, and the status difference of the to-be-predicted obstacle into the encoder, to cause the encoder to output a hidden variable corresponding to the to-be-predicted obstacle; and inputting the hidden variable corresponding to the to-be-predicted obstacle, the individual interaction feature of the to-be-predicted obstacle, the information about the environment around the vehicle, and the status difference of the to-be-predicted obstacle into the decoder, to cause the decoder to output the future motion trajectory of the to-be-predicted obstacle.

12. The device according to claim 11, wherein obtaining the hidden variable corresponding to the vehicle according to the historical status information and the current status information of the vehicle comprises:

determining a status difference of the vehicle from the historical status to the current status according to the historical status information and the current status information of the vehicle; and inputting an individual interaction feature of the vehicle, the information about the environment around the vehicle, and the status difference of the vehicle into the encoder, to cause the encoder to output the hidden variable corresponding to the vehicle, wherein the individual interaction feature of the vehicle is obtained according to the current status information of the vehicle and the global interaction feature; and obtaining the hidden variables respectively corresponding to each of the one or more obstacles according to the historical status information and the current status information of each of the one or more obstacles comprises:

for each of the one or more obstacles, determining, a status difference of the obstacle from the historical status to the current status according to the historical status information and the current status information of the obstacle; and inputting an individual interaction feature of the obstacle, the information about the environment around the vehicle, and the status difference of the obstacle from the historical status to the current status into the encoder, to cause the encoder to output the hidden variable corresponding to the obstacle.

13. The device according to claim 9, wherein determining the individual interaction feature of the to-be-predicted obstacle under the joint action according to current status information of the to-be-predicted obstacle and the global interaction feature comprises:

determining a feature vector corresponding to the current status information of the to-be-predicted obstacle as a current status vector of the to-be-predicted obstacle;

determining a feature vector corresponding to the global interaction feature as a global interaction vector; and determining the individual interaction feature of the to-be-predicted obstacle under the joint action according to a vector dot product of the current status vector of the to-be-predicted obstacle and the global interaction vector.

14. The device according to claim 9, wherein inputting information about the environment around the vehicle into the pre-trained trajectory prediction model comprises:
acquiring an actual image of a current environment around the vehicle;
determining a global environment feature according to the actual image;
determining, according to a position of the to-be-predicted obstacle in the actual image, a position of a local environment feature corresponding to the to-be-predicted obstacle in the global environment feature as a reference position;
determining an environment feature corresponding to the reference position in the global environment feature as the local environment feature corresponding to the to-be-predicted obstacle; and
inputting the determined local environment feature corresponding to the to-be-predicted obstacle into the pre-trained trajectory prediction model.

15. The device according to claim 14, wherein determining the global environment feature according to the actual image comprises:
recognizing key elements comprised in the actual image;
determining positions of the key elements in the actual image;
generating an abstract image corresponding to the actual image according to the positions of the key elements in the actual image and predetermined models respectively matching the key elements; and
determining the global environment feature according to the abstract image.

* * * * *